United States Patent
Springer

[19]

[11] Patent Number: 5,915,797
[45] Date of Patent: Jun. 29, 1999

[54] BRAKING APPARATUS FOR TOWED VEHICLES

[75] Inventor: William O. Springer, Fargo, N. Dak.

[73] Assignee: Springer Family Patents Limited Parternship, Fargo, N. Dak.

[21] Appl. No.: 08/696,703

[22] Filed: Aug. 14, 1996

Related U.S. Application Data

[60] Provisional application No. 60/002,315, Aug. 14, 1995.

[51] Int. Cl.⁶ .................................................. B60T 13/00
[52] U.S. Cl. ........................ 303/7; 188/3 R; 188/112 R; 74/532
[58] Field of Search .............................. 303/3, 7, 15, 20, 303/16; 188/3 H, 3 R, 112 R; 74/512, 532; 180/167

[56] References Cited

U.S. PATENT DOCUMENTS

| | | |
|---|---|---|
| 2,177,469 | 10/1939 | White . |
| 2,711,228 | 6/1955 | Shank ........................ 188/3 H |
| 3,790,807 | 2/1974 | Rossogno ..................... 303/7 |
| 3,866,719 | 2/1975 | Streutker ..................... 303/7 |
| 4,109,968 | 8/1978 | Wood ......................... 303/7 |
| 4,222,614 | 9/1980 | Spechko . |
| 4,756,390 | 7/1988 | Meadows . |
| 5,012,689 | 5/1991 | Smith . |
| 5,031,729 | 7/1991 | Wittkop et al. ............. 188/3 H |
| 5,411,321 | 5/1995 | Harness ..................... 188/3 H |

*Primary Examiner*—Lee W. Young
*Attorney, Agent, or Firm*—Merchant, Gould, Smith, Edell, Welter & Schmidt

[57] ABSTRACT

A braking apparatus engages the brakes of a towed vehicle and is actuated by the engaging the brake of the towing vehicle. A pivotally mounted foot pedal engaging member attaches to the floor of the towed vehicle and depresses the brake pedal of the towed vehicle when actuated. A pneumatic cylinder forces the engaging member to depress the brake pedal when air is supplied to the cylinder. Air is supplied from air brakes in the towing vehicle or from another pressurized air source. Air to the pneumatic cylinder matches the force of the towing vehicle if equipped with air brakes, or is controlled by a flow regulator and pressure regulator.

17 Claims, 7 Drawing Sheets

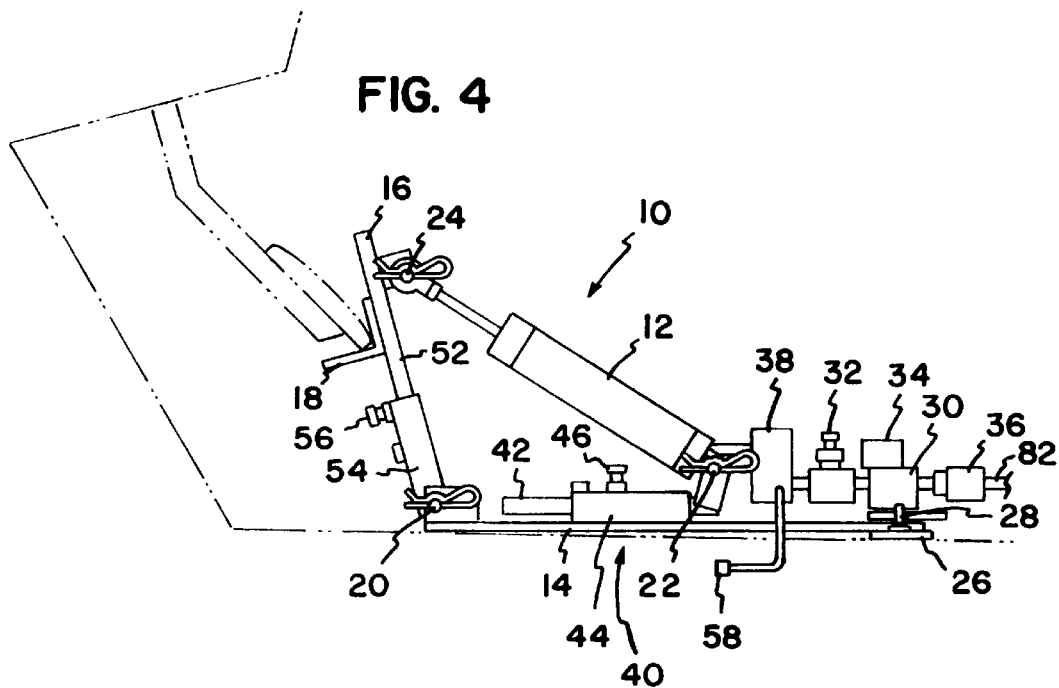
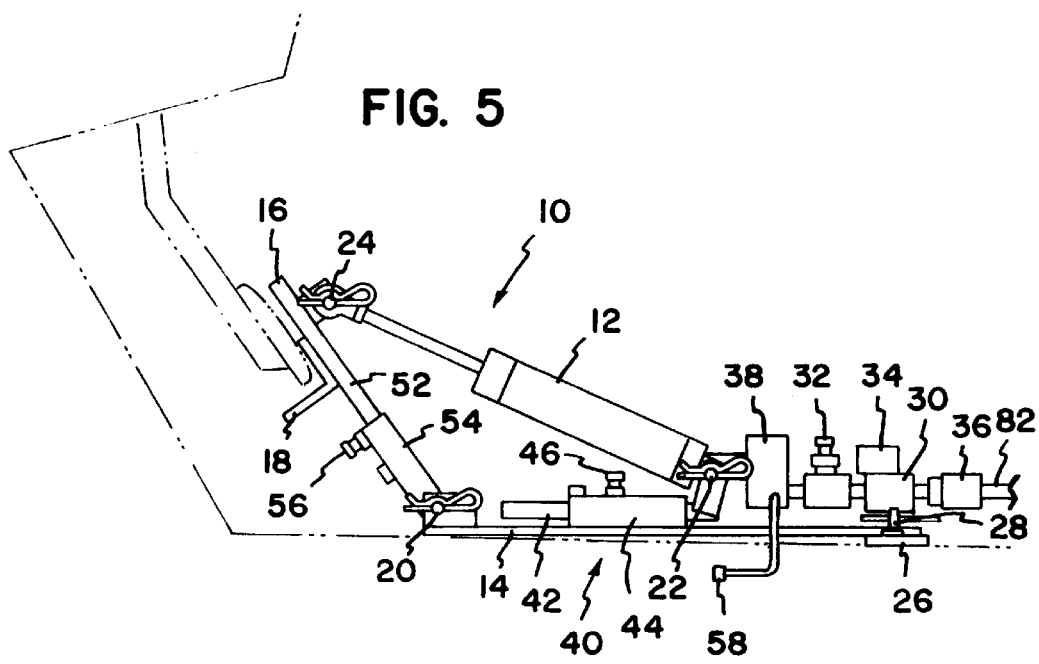

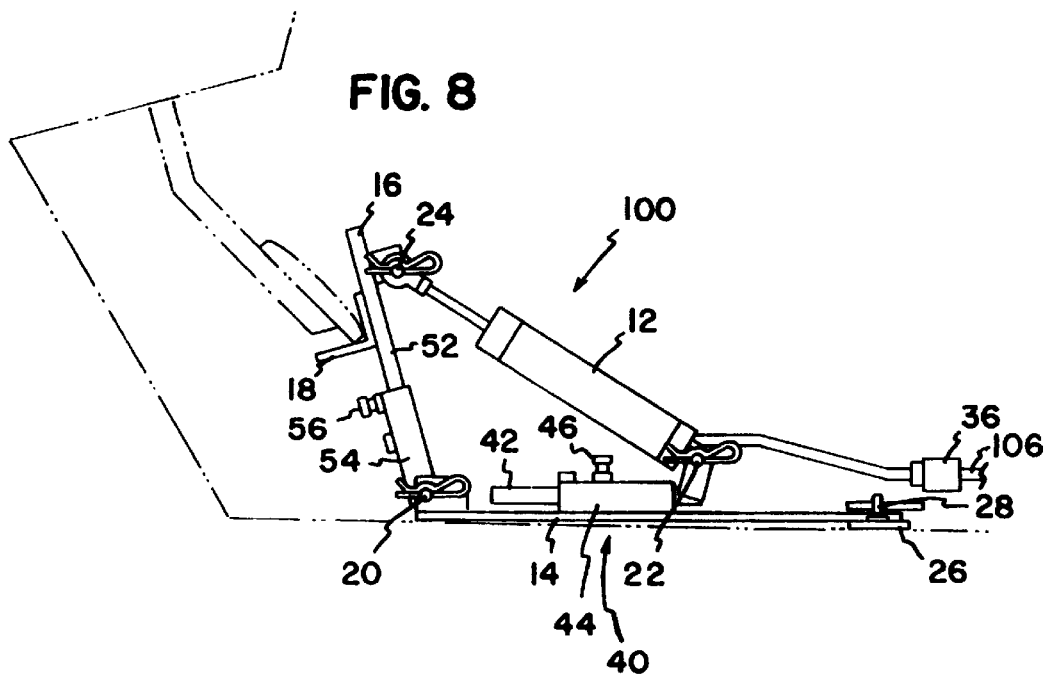
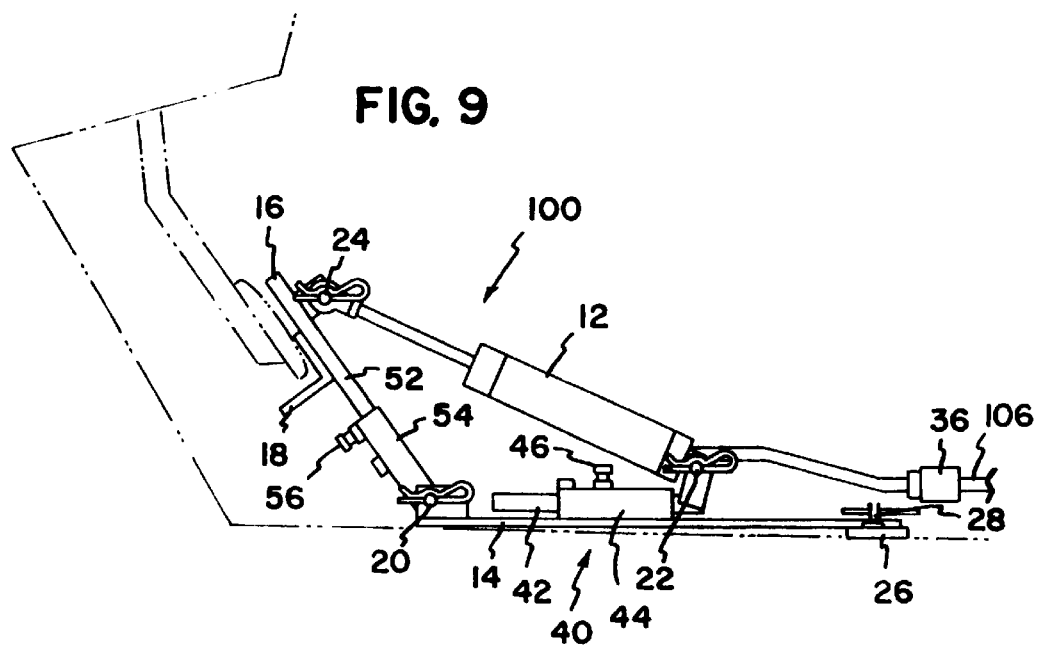

BRAKING APPARATUS FOR TOWED VEHICLES

This application claims the benefit of U.S. Provisional Application No. 60/002,315, filed Aug. 14, 1995.

BACKGROUND OF THE INVENTION

1. Field of the Invention

The present invention is directed to an apparatus for applying the brake system of a vehicle being towed and, in particular, to a braking apparatus which depresses the brake pedal of the towed vehicle by remote actuation from the towing vehicle.

2. Prior Art

Vehicles are often towed behind another vehicle to avoid operating both vehicles and to save fuel and other transportation costs. However, several problems arise with such a towing arrangement. Adequate power is needed from the towing vehicle, as well as providing for braking and turn signaling from the towed vehicle. Generally, the brakes of the towing vehicles are not designed for stopping the towing vehicle and the additional weight of a towed vehicle. Therefore, it is advantageous to provide an arrangement wherein the brakes of the towed vehicle may be applied to supplement the towing vehicle's braking capabilities.

To remotely apply brakes of towed vehicles, several problems are encountered. A first problem is coordination of the application of the brakes with that of the towing vehicle. If the towed vehicle's brake system is applied for too short or too long of a period, the handling of the vehicles may become extremely difficult. In addition, it is desirable to have the intensity of the brake force of the towed vehicle be substantially similar to that of the towing vehicle. For example, if the brake is just lightly applied by the towing vehicle, it should also be lightly applied by the towed vehicle. If the towing vehicle applies hard braking forces, the braking force in the towed vehicle should also be stronger.

Systems for remotely applying a braking force in the towed vehicle should be easily installed with little modification required for installation. In addition, such devices should be easily removed from the vehicle so that the towed vehicle may be uncoupled from the towing vehicle and easily operated without undue modification.

An example of a braking apparatus is shown is U.S. Pat. No. 5,411,321. The brake control utilizes a pneumatic cylinder to actuate the brake pedal of the towed vehicle. However, the device suffers from several shortcomings. The device is difficult to install and remove quickly, as it requires clamping of the device to the brake pedal. In addition, the device must be secured to the floor of the towed vehicle and does not provide for easy, quick disconnecting. In addition, the device is actuated by a transmitter in the towing vehicle rather than just automatically actuated with application of the brakes from the towing vehicle. The device also requires installation of an air compressor and a motor as well as a battery in the towed vehicle and does not provide for varying the towed vehicle braking pressure, so the brakes in the towed vehicle do not always have the same force as the brakes in the towing vehicle.

It can be seen then that a new and improved apparatus for applying the brakes in a towed vehicle is needed. Such a device should be easily installed and removed from the towed vehicle and require little modification of the towing vehicle. In addition, such a device should provide for mirroring the brake force applied by the towing vehicle with actuation from application of the brakes in the towing vehicle. The device should be adapted to a wide variety of makes and models and be adaptable to fit the configuration of each vehicle with little adjustment required. The present invention addresses these as well as other problems associated with remote brake application in towed vehicles.

SUMMARY OF THE INVENTION

The present invention is directed to a braking apparatus and, in particular, to a braking apparatus for applying the brakes of a towed vehicle by remotely actuating the brakes in a towing vehicle.

According to a first embodiment of the present invention, a pneumatic cylinder mounts to a removable base on the floor of the towed vehicle in front of the driver's seat. The pneumatic cylinder is connected to a brake pedal engaging member which pivotally connects to the base. The pneumatic cylinder and brake pedal engaging member are adjustable to configure a shoe on the brake pedal engaging member to rest against the front of the brake pedal. Extension of the pneumatic cylinder forces the brake pedal engaging member against the brake pedal, thereby depressing the brake pedal and applying the brake of the towed vehicle.

In a first embodiment, the pneumatic cylinder is supplied with air through a solenoid valve. The solenoid valve is actuated from a circuit in the brake light system of the towing vehicle. Therefore, upon actuation of the brake system in the towing vehicle, the brake light system is energized, thereby also energizing an actuator circuit to the solenoid valve. This opens the valve and extends the cylinder to depress the brake pedal.

Air is supplied from a tank/compressor on the towing vehicle or other source to provide air to the pneumatic cylinder in the first embodiment. Air flow to the valve is controlled by a flow regulator and a pressure regulator to control air flow to the cylinder.

In an alternate embodiment, the braking apparatus utilizes air from air brakes on the towing vehicle. In this manner, air flow to the braking apparatus pneumatic cylinder is substantially the same as the air flow to the air brakes in the towing vehicle. With this configuration, the air flow to the pneumatic cylinder starts and stops as the brakes in the towing vehicle are engaged and disengaged.

In another alternate embodiment of the invention, the pneumatic cylinder mounts to a supporting bracket onto the seat of the towed vehicle. The engaging member attaches around the brake pedal so that the pneumatic cylinder depresses the pedal when extended.

In the preferred embodiment, the brake pedal engaging member and the pneumatic cylinder are foldable and easily removable with quick disconnect air and electrical connections so that the entire braking apparatus may be easily removed when not in use.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letter indicate corresponding elements throughout the several views:

FIG. 4 shows a side elevational view of a first embodiment of the braking apparatus shown in FIG. 1;

FIG. 5 shows a side elevational view of the braking apparatus shown in FIG. 4 in an actuated position;

FIG. 8 shows a side elevational view of the braking apparatus shown in FIG. 7;

FIG. 9 shows a side elevational view of the braking apparatus shown in FIG. 8 in an actuated position;

DETAILED DESCRIPTION OF THE PREFERRED EMBODIMENT

Figure 1:
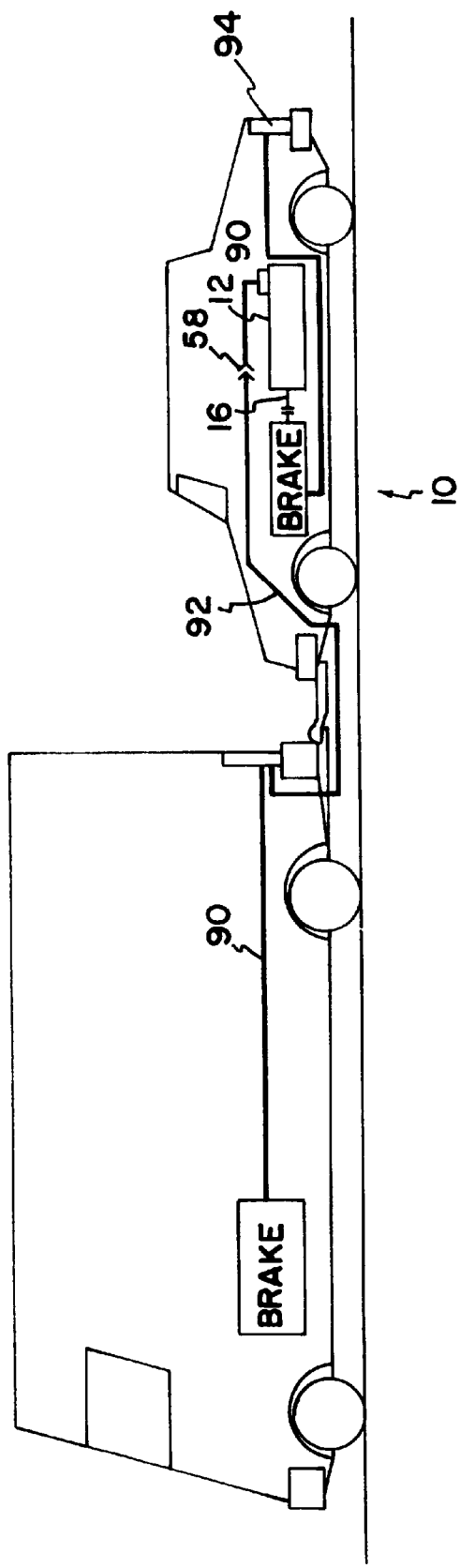
FIG. 1 shows a diagrammatic view of a braking apparatus for a towed vehicle and the braking apparatus electrical system according to the principles of the present invention.

Referring now to the drawings, and in particular to FIG. 1, there is shown a diagrammatic view of a first embodiment of a braking apparatus, generally designated 10. The braking apparatus 10 remotely actuates the brakes in a towed vehicle by engaging the brakes in a towing vehicle. In a first embodiment, the driver depresses the brake pedal in the towing vehicle to engage the towed vehicle's brake system by depressing its brake pedal. As shown in FIG. 4, the braking apparatus 10 includes a pneumatic cylinder 12 which pushes against a brake pedal engagement member 16 to depress the brake pedal and actuate the towed vehicle's brake system, as explained hereinafter.

In a first embodiment, the braking apparatus 10 mounts on the floor in front of the driver's seat in the towed vehicle. A base 14 bolts onto a mounting plate 26 with bolts or other retaining members 28 which provide for removing and inserting the entire braking apparatus 10 quickly and easily leaving only the mounting plate 26, so that the towed vehicle may be operated when disconnected from the towed vehicle without the braking apparatus 10 affecting operation of any foot pedals or the comfort of the driver. The brake pedal engaging member 16 pivotally mounts about a pivot pin 20 at a forward edge of the base 14. In the preferred embodiment, the pivot pin 20 is removable and provides for removal or folding of the brake engaging member 16 for easier storage of the apparatus 10. The brake engaging member 16 includes a shoe member 18 having a lower heel portion extending under the lower surface of the brake pedal. In the preferred embodiment, the brake pedal engaging member 16 is adjustably retractable and extendable to match the configuration of the particular vehicle's brake pedal. A lower frame member 54 receives a rod 52 slidably mounted within the frame 54 to extend and retract the brake pedal engaging member 16. A set screw or other retaining device 56 provides for locking the rod 52 of the brake pedal engaging member 16 so that the shoe 18 fits correctly against the brake pedal.

Figure 6:
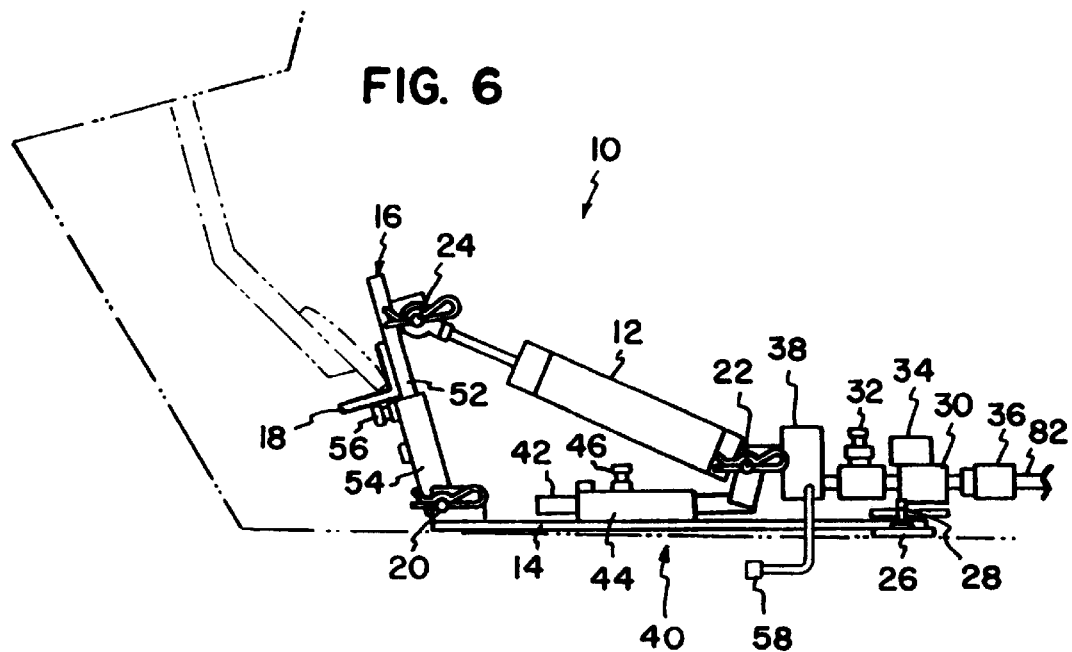
FIG. 6 shows a side elevational view of the braking apparatus shown in FIG. 4 in a second mounting position.

In a similar manner, the pneumatic cylinder 12 pivotally mounts about a removable pin 22. In addition, the cylinder mounts to the brake pedal engaging member 16 about a removable pivotal pin 24. In this manner, the cylinder 12 can be removed or folded for storage. The pneumatic cylinder 12 includes an adjustable mounting portion having a rod 42 slidably mounted within a sleeve-type member 44. A set screw or other retaining member 46 provides for sliding adjustment of the pneumatic cylinder 12. It can be appreciated that with the adjustment of the cylinder 12, the length of the stroke as well as the relative position of the brake engaging member 16 may be varied. The adjustment of the position of the base 14, the position of the pneumatic cylinder 12, the engaging position of the brake pedal engagement member 16, and the height of the shoe and heel member 18 provide for configuring the braking apparatus 10 to fit a wide variety of vehicles, while ensuring proper operation when depressing the brake pedal. An example of the adjustability of the apparatus 10 is shown in FIG. 6, wherein the cylinder 12 and the brake pedal engaging member 16 are reconfigured for a second vehicle having a different brake pedal-floor arrangement.

Figure 2:
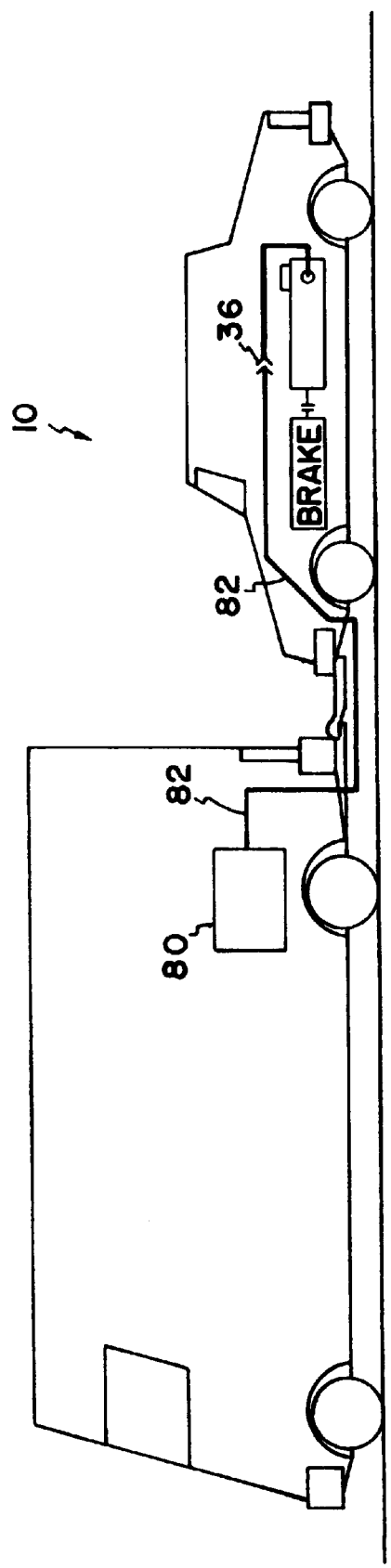
FIG. 2 shows a diagrammatic view of the air system for the braking apparatus shown in FIG. 1.
Figure 3:
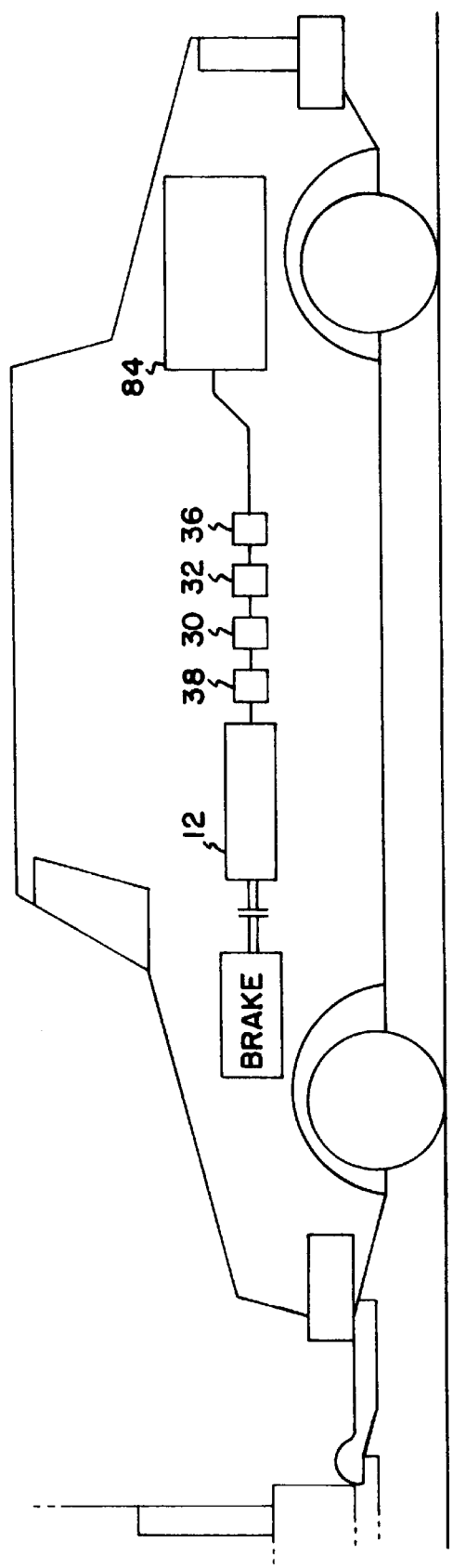
FIG. 3 shows a diagrammatic view of a second embodiment of an air system for the braking apparatus shown in FIG. 1.

As shown in FIG. 2, air to the cylinder may be supplied by a compressor or air pressure accumulator 80 in the towing vehicle. In a common towing arrangement, a recreational vehicle such as a motor home pulls a passenger car. Many motor homes have an air source or compressor on board to provide pressurized air for actuating the cylinder 12. An air line 82 extends from the towing vehicle compressor 80 along the hitch or trailer for the towed vehicle to a quick disconnect 36, shown in FIG. 4. In an alternate embodiment shown in FIG. 3, an air tank 84 may be placed in the towed vehicle to supply pressurized air for actuation of the cylinder 12. The tank 84 may be easily removed and refilled for supplying pressurized air to the pneumatic cylinder 12.

Referring again to FIG. 4, regulation of the air to the pneumatic cylinder 12 provides for proper brake pressure and control. If the brake pedal is depressed too quickly, the brakes in the towed vehicle may be "slammed" on. If the air flow is insufficient, there may not be sufficient pressure from the towed vehicle to safely stop both vehicles when the brakes in the towing vehicle are applied.

A valve 38 is actuated and deactuated with application of the towing vehicle's brakes to provide pressurized air to the pneumatic cylinder 12. In the preferred embodiment, the valve is a quick response solenoid-type valve actuated by an electrical circuit, as explained hereinafter. In addition, flow of the air to the valve 38 is also controlled. In a preferred embodiment, a pressure regulator 30 prevents a build up of pressure so that the cylinder applies pressure to the brake pedal at the proper rate and with proper force, rather than having a burst of high pressure air upon opening the valve 38. The pressure regulator 30 may also include a pressure gauge 34 so that proper adjustments may be made. During installation, the pressure regulator 30 is adjusted so that proper pressure is applied for the type and size of the vehicle being towed. In addition to the pressure regulator 30, in the preferred embodiment, an air flow regulator 32 is also utilized. The air flow regulator 32 provides sufficient air without allowing too much air flow to pass through the valve 38. In this manner, the pneumatic cylinder 12 is extended and retracted at the proper speed and with proper force.

Referring again to FIG. 1, opening of the valve 38 supplies air to the pneumatic cylinder 12 to depress the brake pedal in the towed vehicle. Actuation of the valve 38 is controlled by an electrical actuator circuit 92 connected to the towing vehicle. In the preferred embodiment, the solenoid valve 38 is wired through a quick disconnect 58 through the actuator circuit 92 to a brake light circuit 90 of the towing vehicle. Therefore, upon actuation of the brakes in the towing vehicle, the brake light circuit 90 is energized and the brake lights will be lighted. This energizes the actuator circuit 92, which energizes and opens the solenoid valve 38, thereby allowing air flow to the pneumatic cylinder 12. The cylinder 12 extends to depress the brake pedal and actuate the brake system in the towed vehicle. It can be appreciated that the actuator circuit 92 is preferably connected into the brake light system 94 of the towed vehicle so that other motorists are alerted to the braking of both the towing and towed vehicles. It can be appreciated that from many truck and trailer rental agencies, electrical taps to the brake lights are available for trailers. These splices can be utilized with the present invention so that wiring is a simple operation. In addition, there may be other types of portable brake light signals which are attachable to the towed vehicle which may also provide a wiring source for energizing the solenoid valve 38.

Upon actuation of the braking apparatus 10, the solenoid valve 38 is opened. This provides for air passing through to the pneumatic cylinder 12. As greater pressure is applied through the pneumatic cylinder 12, the piston rod of the cylinder extends, thereby pushing against the braking pedal engagement member 16. As the brake pedal engagement member 16 is pivoted forward, the brake pedal is depressed, as shown in FIG. 5. As long as the brake pedal in the towing vehicle is depressed, the actuator circuit 92 is energized and the valve 38 remains open so that continued pressure is applied to the brake pedal and therefore to the brake system in the towed vehicle. However, when the brake pedal in the towing vehicle is released, the actuator circuit 92 is deenergized and the solenoid valve 38 closes. The hydraulic pressure from the brakes in the towed vehicle pushes the brake pedal upward to restore the braking apparatus 10 to the unactuated position, shown in FIG. 4. The hydraulic pressure maintains the apparatus 10 in the non-actuated position.

Figure 7:
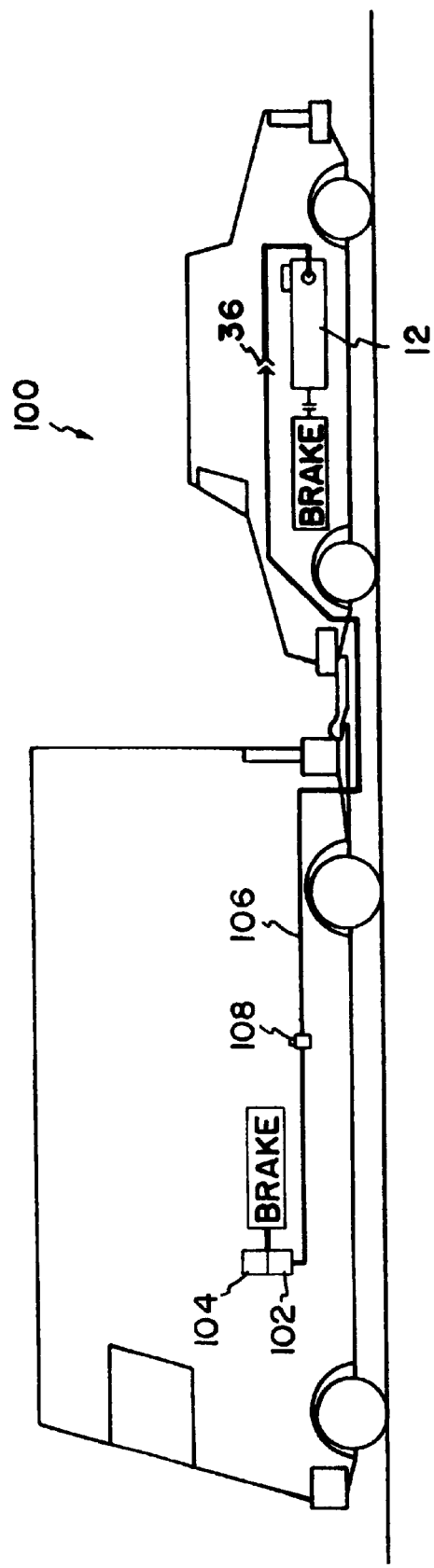
FIG. 7 shows a diagrammatic view of a second embodiment of a braking apparatus according to the principles of the present invention.

Referring now to FIG. 7, there is shown another embodiment of a braking apparatus according to the principles of the present invention, generally designated 100. It can be appreciated that some towing vehicles will include a brake system which includes pneumatic brakes or pneumatic over hydraulic brake systems. As the brake system in the towing vehicle is actuated, the pneumatic brake system supplies air to the brakes. This air source, such as an air booster cylinder can be tapped to supply air to the towed vehicle's braking system 100. According to the embodiment shown in FIG. 7, the brake system of the towing vehicle may include a hydraulically-actuated portion of the brakes, generally designated 104, and a pneumatically-actuated braking system 102. An air line leads from the pneumatic brake system actuator 102 to a quick disconnect 36 and the pneumatic cylinder 12, as explained hereinafter. A valve 108 controls flow through the air line 106 to limit the air flow which is supplied to the pneumatic cylinder 12 in the towed vehicle. In a preferred embodiment, the valve 108 is adjustable and is set prior to use so that the air from the pneumatic brakes 102 is matched correctly to the requirements of the pneumatic cylinder 12 and the braking apparatus 100. It has been found that a control valve manufactured by Nineway Anchorlock International, of Muskegon, Mich., Model No. 90054081, works well for controlling the air to the braking system 100.

It can be appreciated that with this configuration, the braking apparatus 100 utilizes air which substantially matches the force and duration of the application of the brakes in the towing vehicle for improved handling. Therefore, when the brakes are lightly tapped in the towing vehicle, less air is supplied to the pneumatic cylinder 12 in the towed vehicle so that the brakes in the towed vehicle are lightly applied as well. However, if the a harder braking force is applied to braking system in the towing vehicle, greater air flow is supplied to the pneumatic cylinder 12 in the towed vehicle so that the brakes are applied with a harder force. It can also be appreciated that the air supply to the pneumatic cylinder 12 ceases when the brakes in the towing vehicle are disengaged. Therefore, the braking apparatus 100 applies the brakes in the towed vehicle in a manner which substantially mirrors the application of the brakes in the towing vehicle.

Referring to FIGS. 8 and 9, the braking apparatus 100 utilizes the pneumatic cylinder 12 with the base 26 and brake pedal engaging member 16 in a similar manner to the embodiment shown in FIGS. 4–6. However, since the air supply to the pneumatic cylinder 12 is controlled by the application of the brakes in the towing vehicle, a valve, flow regulator and pressure regulator are not required in the embodiment shown in FIGS. 7–9. Therefore, the quick disconnect 36 provides coupling and decoupling to the air line 106 for easy installation and removal of the apparatus 100.

Figure 10:
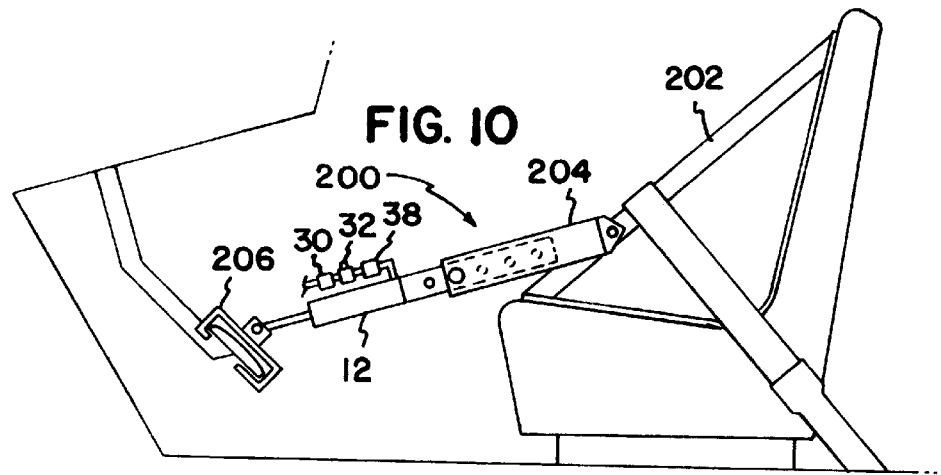
FIG. 10 shows a side elevational view of an alternate embodiment of the braking apparatus shown in FIG. 1.

Referring now to FIG. 10, there is shown another alternate embodiment of a braking apparatus, generally designated 200, according to the principles of the present invention. The second embodiment of the braking apparatus 200 sets on the driver's seat of a vehicle on a seat mounting member 202 rather than the floor of the vehicle. In addition to the seat mounting member 202, an adjustable cylinder holding member 204 mounts the pneumatic cylinder 12 to the seat mounting member 202. A C-channel type brake pedal engaging member 206 slides over the side of the brake pedal and is retained by flanges inserting around the sides of the brake pedal. It can be appreciated that although the cylinder 12, the valve 38 and regulators 30 and 32 are supported from the holding member 204, their operation is identical to the floor-mounted embodiment. It can also be appreciated that the seat supported braking apparatus 200 may tap into the air brake system of a towing vehicle, as shown in FIG. 7, if the towing vehicle is equipped with an air brake system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A braking apparatus for applying the brakes in a towed vehicle from a towing vehicle, comprising:

a base adapted for mounting to the floor of the towed vehicle;

brake pedal engaging means pivotally mounted to the base at a first location for engaging the brake pedal of the towed vehicle;

a pneumatic cylinder connected to the brake pedal engaging means and extending down and to the rear, wherein the pneumatic cylinder pivotally mounts to the base at a second location behind the first location, wherein application of air pressure to the cylinder extends the cylinder, thereby pushing the brake pedal engaging means and depressing the brake pedal; and, an air source for providing pressurized air to the pneumatic cylinder.

2. A braking apparatus according to claim 1, wherein the pneumatic cylinder comprises a movable piston and a piston rod slidably extending from the piston and pivotally connected to the brake pedal engaging means.

3. A braking apparatus according to claim 1, wherein the mounting base removably mounts to the floor of the towed vehicle.

4. A braking apparatus according to claim 1, further comprising means for adjusting the height of the brake pedal engaging means.

5. A braking apparatus according to claim 1, further comprising an air flow regulator for regulating the air flow from the air source to the pneumatic cylinder.

6. A braking apparatus according to claim 1, further comprising pressure regulation means for regulating the air pressure to the pneumatic cylinder.

7. A braking apparatus according to claim 1, further comprising cylinder actuation means.

8. A braking apparatus according to claim 5, wherein the cylinder actuation means comprises electrical signal means tapping into brake light signal circuits of the towing vehicle.

9. A braking apparatus according to claim 1, wherein the air source comprises a pressurized air from the towing vehicle.

10. A braking apparatus according to claim 1, wherein said base removably mounts to the floor of the towed vehicle, and wherein connection to the air source and an electrical signal means comprises quick disconnects.

11. An apparatus according to claim 1, wherein the pneumatic cylinder and brake pedal engaging means are separately removably mounted on the base.

12. A system for remotely actuating a brake of a towed vehicle having a brake pedal, from a towing vehicle, the towing vehicle having a braking system and a brake signal with a brake signal circuit, comprising:

a base mounted to the floor of the towed vehicle;

a pneumatic cylinder having a movable piston and a piston rod extending from the piston pivotally mounted to the base at an adjustable mount for adjusting the mounting location on the base;

a brake engaging member coupled to the piston rod and mounted to the base intermediate the brake pedal and the pneumatic cylinder, wherein the brake engaging member is positioned for engaging the brake pedal of the towed vehicle, and wherein extension of the piston rod pushes the brake engaging member and depresses the brake pedal;

an air source providing air under pressure to the pneumatic cylinder; and, means for remotely actuating the system, triggered by energizing the brake signal circuit of the towing vehicle.

13. A system according to claim 12, further comprising flow regulation means for regulating air provided to the pneumatic cylinder.

14. A system according to claim 12, further comprising a pressure regulator for regulating the air pressure provided to the pneumatic cylinder.

15. A system according to claim 12, wherein the brake signal circuit is energized by application of the towing vehicle brake.

16. A braking apparatus for applying the brakes in a towed vehicle from a towing vehicle, comprising:

a brake pedal shoe pivotally supported on an extendible pivot member, wherein the shoe engages the brake pedal of the towed vehicle;

a pneumatic cylinder pivotally connecting to the pivot member, wherein application of air pressure to the cylinder extends the cylinder, thereby pushing the extendible pivot member and depressing the brake pedal;

a mounting base adapted for removably mounting to the floor of the towed vehicle for pivotally mounting the pneumatic cylinder at a first pivot and pivotally mounting the extendible pivot member at a second pivot spaced apart from the first pivot;

an air source for providing pressurized air to the pneumatic cylinder; and an adjustable cylinder mount for adjusting the location of the first pivot relative to the mounting base.

17. A braking apparatus according to claim 16, further comprising an adjustable cylinder mount for adjusting the location of the first pivot relative to the mounting base.

* * * * *